April 8, 1924.  A. L. SEGELHORST  1,489,902
CATHEAD GUARD
Filed June 14, 1923  2 Sheets-Sheet 1
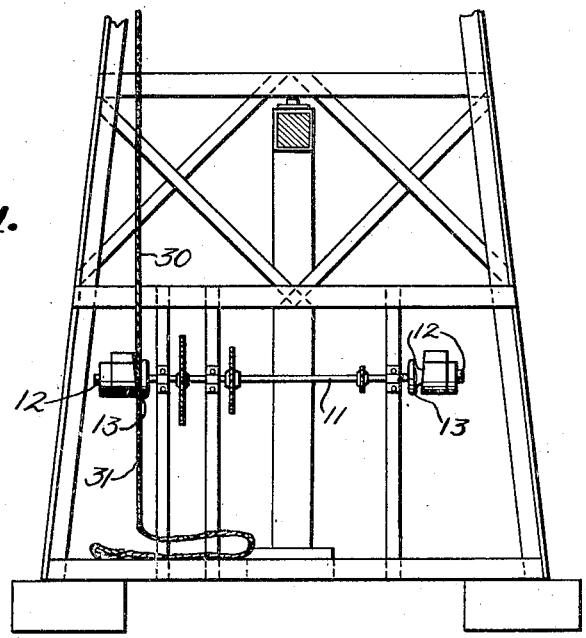
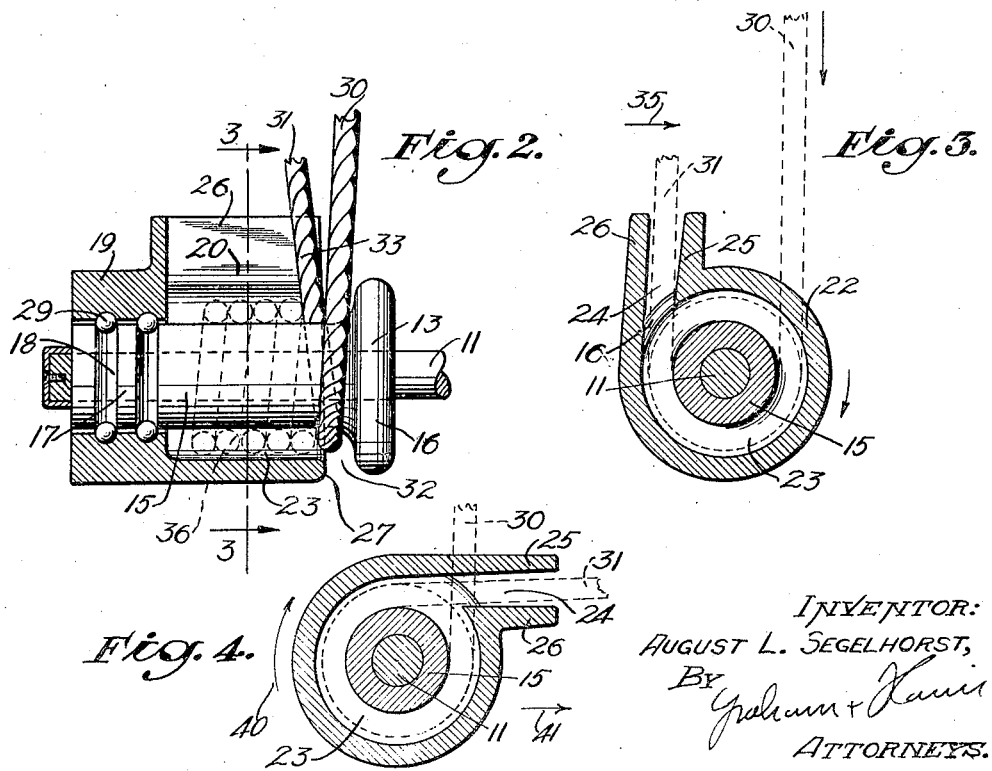
INVENTOR:
AUGUST L. SEGELHORST,
BY
ATTORNEYS.

April 8, 1924.                    A. L. SEGELHORST                    1,489,902
                                    CATHEAD GUARD
                            Filed June 14, 1923        2 Sheets-Sheet 2
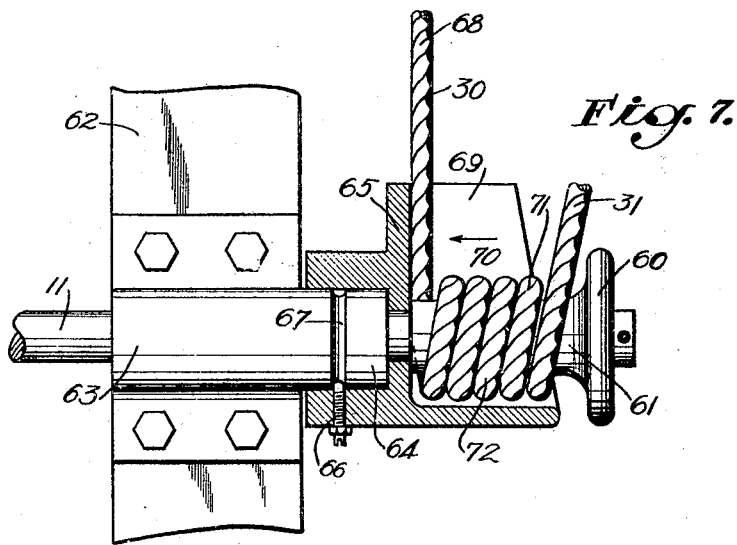
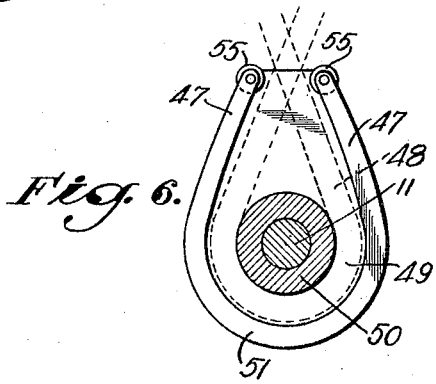
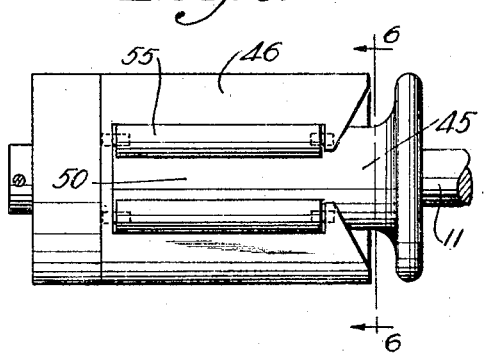
INVENTOR:
AUGUST L. SEGELHORST,
BY
                ATTORNEYS.

Patented Apr. 8, 1924.

1,489,902

UNITED STATES PATENT OFFICE.

AUGUST L. SEGELHORST, OF WHITTIER, CALIFORNIA.

CATHEAD GUARD.

Application filed June 14, 1923. Serial No. 645,479.

*To all whom it may concern:*

Be it known that I, AUGUST L. SEGELHORST, a citizen of the United States, residing at Whittier, in the county of Los Angeles, State of California, have invented a new and useful Cathead Guard, of which the following is a specification.

This invention relates to oil well drilling and producing equipment, and relates particularly to hoisting apparatus constituting a part of this equipment.

The draw works of an oil drilling rig generally includes a pair of spools disposed upon the extending ends of a rotatable shaft, around which spools a rope may be wound so that the frictional engagement will cause the rope to be pulled over the spool in a manner similar to that accomplished by a capstan but disposed in horizontal position. Such spools are commonly termed cat heads and are employed for moving and lifting various members of the equipment within the derrick. Owing to the fact that the cat head is driven from an engine situated some distance from the derrick, absolute control of its rotation is not possible and serious accidents have resulted due to the rope wound upon the cat head becoming piled up and caught in such a manner as to draw the hands of the workman into the coil with the result that he is rotated therewith and either severely or fatally injured before the engine can be stopped.

It is an object of the invention to provide a guard which may be used upon the cat head in such a manner as to prevent the rope from being wound in more than a single layer or spiral. This prevents the rope from piling up, with the result that there is no possibility of its becoming caught.

It is a further object of the invention to provide a cat head guard which will prevent the hands of the workman being drawn into the spiral of rope wound upon the cat head.

The especial advantages of the invention and further objects thereof will be made evident hereinafter.

Referring to the drawings which are for illustrative purposes only,

Fig. 1 is a diagrammatic view showing the manner in which cat heads equipped with a form of my invention are employed in an oil well rig.

Fig. 2 is a longitudinal sectional view of the leftward cat head shown in Fig. 1.

Fig. 3 is a section taken upon a plane represented by the line 3—3 of Fig. 2.

Fig. 4 is a view similar to Fig. 3 showing the guard swung over into lateral position.

Fig. 5 is a plan view of a cat head equipped with a form of guard having rollers disposed along the edges thereof to relieve friction of the rope with the walls of the guard.

Fig. 6 is a section taken on a plane represented by the line 6—6 of Fig. 5.

Fig. 7 is a fragmentary partially sectioned view showing another form in which the cat head guard may be employed.

In Fig. 1 of the drawing a horizontal shaft 11 is shown which constitutes a part of a draw works. Upon the extending ends 12 of the shaft 11, cat heads 13 as shown in Figs. 2 and 3 are mounted. The ordinary cat head consists of a barrel portion having a flange disposed at each end thereof, but the cat head 13 employed with my invention is comprised of a central barrel portion 15 having a flange 16 formed at the inner end thereof and a cylindrical portion 17 at the outer end thereof having ball bearing channels 18 cut therein and serving as a bearing for the hub 19 of the guard member 20. Inwardly extending from the hub 19 is a cylindrical wall 22 sustained concentric with the barrel 15 and being sufficiently larger than the barrel 15 to provide an annular space 23 which is slightly wider than the diameter of the rope employed. Formed in the wall 22 is a longitudinal slot 24 which is confined by outwardly extending walls 25 and 26. It will be noted that the forward end of the slot 24 is open and that the forward end 27 of the wall 22 is spaced away from the flange 16, a distance slightly greater than the diameter of the rope 30. Ball bearings 29 are provided between the cylindrical portion 17 of the cat head and the hub 19 of the guard 20 so that the cat head may rotate freely within the guard.

It will be noticed that in the form of the invention shown in Figs. 1 to 3 the slot 24 is tangentially disposed. In the employment of this cat head the rope 30, extending down from a pulley situated at the top of the derrick, is passed in front of the cat head in the manner shown and the lower end 31 thereof is swung rearwardly around the cat head so that it will pass through the space 32 existing between the end 27 of the guard 20 and the flange 16. The lower end 31 may then as indicated in Fig. 2 and Fig. 3 be passed into the slot 24 as indicated at 33. By moving the end 31 in a circle about the axis of the shaft 11, as indicated by the arrow 35 in Fig. 3, a spiral of rope may be wound upon the barrel portion 15 of the cat head, the engagement of the end 31 of the rope with the slot 24 causing the guard 20 to be rotated with the rope in the direction of the arrow 35 and a spiral such as indicated by the dotted lines 36 is formed upon the barrel. It will be recognized that the end 31 of the rope will travel longitudinally in the slot 24 in a direction toward the hub 19.

Owing to the fact that a person using the cat head is generally situated at a position near the level of the cat head, the final position of the slot 24, when the spiral 36 of rope has been wound upon the barrel portion 15, will be in a horizontal direction as indicated in Fig. 4. Assuming that the cat head is rotated in a right hand direction as indicated by the arrow 40, which is common practice, a pull upon the end 31 of the rope will cause the spiral or coil 36 to tighten upon the barrel portion 15 of the cat head in such a manner that a frictional driving engagement therewith is accomplished which causes the upper portion of the rope 30 to be drawn downwardly onto the barrel 15 while the end 31 of the rope 30 will be fed off from the outer end of the barrel in a direction indicated by the arrow 41, thus causing the downward pull of the rope 30 and accomplishing thereby any designated piece of work.

The rope 30 is generally extended over a pulley and the free end thereof attached to some heavy object which it is desired to lift. After the object has been lifted in the manner described and it is desired to again lower it, the pull upon the end 31 of the rope is diminished so that the frictional engagement of the spiral 36 with the barrel 15 will be lessened with the result that the rope constituting the spiral will slide backwardly in a direction in reverse to the arrow 40, thus pulling the end 31 inwardly.

It is during this operation of lowering that most accidents occur, as the hands of the workman are drawn with the end 31 of the rope into the spiral and become caught under the rope with the result that serious injury cannot otherwise than occur. It will be recognized that the slot 31 is of but little greater width than the rope diameter and that it will be therefore impossible for the hands of a workman to be drawn into the slot much less to be drawn into the spiral 36 of rope.

In the form of my invention shown in Figs. 5 and 6 I show a cat head 45 equipped with a guard 46 in which the walls 47 are both tangentially disposed so that the rope indicated by the dotted lines 48 may be entered into the space 49 between the barrel portion 50 of the cat head 45 and the cylindrical portion 51 joining the walls 47 in either direction, thus enabling the use of the cat head when the shaft 11 is rotated in either direction.

The invention, as shown in Figs. 5 and 6, may also be equipped with rollers 55 disposed at the edges of the slot included between the walls 47, so that as the rope travels therethrough it will come in contact with the rollers 55 and thus will be prevented from frictional contact with the walls 47 which would cause considerable wear upon the rope.

In the form of the invention shown in Fig. 7, the flange 60 of the cat head 61 is disposed outwardly with relationship to the vertical member 62 which supports the shaft 11, instead of being disposed inwardly as shown in Fig. 1. The bearing member 63 which supports the shaft 11 is provided with a hub extension 64 upon which the guard 65 is turnably placed and sustained in position by a pin 66 which engages a groove 67. In this type of the invention the end 68 of the rope 30 which extends to the pulley situated in the upper portion of the derrick is entered into the slot 69 and is forced inwardly in the direction of the arrow 70 as each turn 71 of the spiral 72 of rope is made, by rotating the end 31 of the rope around the outer portion of the barrel of the cat head so that the separate turns are formed adjacent to the flange 60 and forced inwardly in consecutive order as they are made.

I claim as my invention:

1. In a device of the character described, the combination of: a cylindrical spool member upon which a helix of rope may be wound; means for rotating said spool member; and a guard member on said spool for confining said spiral to a single layer.

2. In a device of the character described, the combination of: a cylindrical spool member upon which a helix of rope may be wound; means for rotating said spool member; and a guard member concentrically disposed on said spool for confining said spiral to a single layer.

3. In a device of the character described, the combination of: a cylindrical spool member upon which a helix of rope may be wound; means for rotating said spool member; and a guard member on said spool for confining said spiral to a single layer, said guard member having a longitudinal slot therein through which an end of said rope may be extended.

4. In a device of the character described, the combination of: a cylindrical spool member upon which a helix of rope may be wound; means for rotating said spool member; and a guard member concentrically disposed on said spool for confining said spiral to a single layer, said guard member having a longitudinal slot therein through which an end of said rope may be extended.

5. In a device of the character described, the combination of: a cylindrical spool member upon which a helix of rope may be wound; means for rotating said spool member; a guard member on said spool for confining said spiral to a single layer; and roller members disposed along said slots for relieving friction of said rope against the wall confining said slot.

6. In a device of the character described, the combination of: a cylindrical spool member upon which a helix of rope may be wound; means for rotating said spool member; a guard member concentrically disposed on said spool for confining said spiral to a single layer, said guard member having a longitudinal slot therein through which an end of said rope may be extended; and roller members disposed along said slots for relieving friction of said rope against the wall confining said slot.

7. In a device of the character described, the combination of: a spool member having a flange at one end thereof; and a guard on said spool member for confining a spiral of rope wound on said spool member to a single layer, said guard having the end thereof in a position spaced away from said flange to permit the passage of rope between said end and said flange.

8. In a device of the character described, the combination of: a spool member having a flange at one end thereof; and a rotary guard on said spool member for confining a spiral of rope wound on said spool member to a single layer, said guard having the end thereof in a position spaced away from said flange to permit the passage of rope between said end and said flange.

9. In a device of the character described, the combination of: a spool member having a flange at one end thereof; and a guard on said spool member for confining a spiral of rope wound on said spool member to a single layer, said guard having a longitudinal slot therein through which an extending end of rope may travel as said spiral of rope is formed, and having the end thereof in a position spaced away from said flange to permit the passage of rope between said end and said flange.

10. In a device of the character described, the combination of: a spool member having a flange at one end thereof, a central barrel portion and a cylindrical portion at the other end thereof; and a guard member rotatably supported upon said cylindrical portion and extending over said barrel portion in such a manner that a cylindrical recess is formed between said barrel portion and the enclosing portion of said guard in which a spiral of rope may be wound upon said barrel portion, there being a longitudinal slot in said enclosing portion of said guard through which the end of said rope may extend and in which said rope may travel as said spiral is formed.

11. In a device of the character described, the combination of: a spool member having a flange at one end thereof, a central barrel portion and a cylindrical portion at the other end thereof; and a guard member rotatably supported upon said cylindrical portion and extending over said barrel portion to a position adjacent to said flange, in such a manner that a cylindrical recess is formed between said barrel portion and the enclosing portion of said guard in which a spiral of rope may be wound upon said barrel portion, there being a longitudinal slot in said enclosing portion of said guard through which the end of said rope may extend and in which said rope may travel as said spiral is formed.

12. In a device of the character described, the combination of: a spool member having a flange at one end thereof, a central barrel portion and a cylindrical portion at the other end thereof; a guard member rotatably supported upon said cylindrical portion and extending over said barrel portion to a position adjacent to said flange, in such a manner that a cylindrical recess is formed between said barrel and the enclosing portion of said guard in which a spiral of rope may be wound upon said barrel portion, there being a longitudinal slot in said enclosing portion of said guard through which the end of said rope may extend and in which said rope may travel as said spiral is formed; and roller members disposed along said slots to prevent frictional contact of said rope with the walls confining said slot.

In testimony whereof, I have hereunto set my hand at Los Angeles, California, this 7th day of June, 1923.

AUGUST L. SEGELHORST.